US008179532B1

(12) United States Patent
Parkin

(10) Patent No.: US 8,179,532 B1
(45) Date of Patent: May 15, 2012

(54) METHOD AND APPARATUS FOR MONITORING THE CONDITION OF A PROJECTOR LAMP

(75) Inventor: John Parkin, Kitchener (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 0 days.

(21) Appl. No.: 13/019,688

(22) Filed: Feb. 2, 2011

(51) Int. Cl.
*G01N 21/00* (2006.01)

(52) U.S. Cl. ........ 356/432; 250/226; 356/218; 356/433; 356/229; 356/51; 362/205; 362/206

(58) Field of Classification Search .................. 250/226; 356/432, 433, 213–235, 51; 315/120, 129; 324/414
See application file for complete search history.

(56) References Cited

U.S. PATENT DOCUMENTS 6,365,899 B1 * 4/2002 Arai et al. .................. 250/338.1
7,434,941 B2 10/2008 Wu et al.
2011/0084613 A1 * 4/2011 Brates et al. .................. 315/119

* cited by examiner

*Primary Examiner* — Gregory J Toatley
*Assistant Examiner* — Iyabo S Alli
(74) *Attorney, Agent, or Firm* — Perry+Currier Inc.; Stephen J. Perry

(57) ABSTRACT

A method and apparatus are set forth for monitoring lamp condition, comprising directing a beam of light at the lamp, detecting percent transmission of the beam through the lamp, wherein the percent transmission is indicative of lamp blackening, and repeating the directing and detecting of the beam of light periodically to provide an indication of lamp blackening over time, wherein the lamp blackening thereby provides an indication of lamp condition over time.

10 Claims, 4 Drawing Sheets

METHOD AND APPARATUS FOR MONITORING THE CONDITION OF A PROJECTOR LAMP

BACKGROUND OF THE INVENTION

1. Field of the Invention

The present invention is directed to projection systems, and more particularly to a method and apparatus for monitoring the condition of a projector lamp.

2. Description of the Related Art

Digital projection systems are well known in the art, having been used for many years in diverse applications, including the film industry, military and civilian simulations, control rooms, etc.

High-end projector systems typically use Xenon arc lamps coupled to an ellipsoid reflector. The reflected light is captured from a first focal point of the reflector and is re-imaged at a second focal point. The second focal point is commonly co-incident with an optical component such as an integrator rod, projector lens, etc., depending on the implementation.

Xenon arc lamps are expensive and subject to performance degradation over time. More particularly, when such lamps are used over a long time, the material contained in the lamp electrodes gradually vaporizes and is deposited on the wall surface of the inside of the lamp bulb—a condition referred to in the art as "blackening." During lamp operation, the blackened portion absorbs heat and light energy from the lamp's arc such that continued lamp operation in the presence of blackening results in a persistent temperature increase and lower luminous output.

Tolerances of lamp components and manufacturing craftsmanship are such that every lamp exhibits unique thermal and luminous performance characteristics relative to its lamp lifetime. Therefore, predicting lamp luminous output as a function of lamp operating life can be difficult. It is known in the art to use profile graphs to characterize the luminous output degradation of a 'typical lamp'. However, projection lamps are often operated under varied conditions that are not covered by the lamp profile graph of a 'typical' lamp and in many instances the lamp graph is either not known or not supplied by the manufacturer.

What is needed therefore is a way to monitor one or more properties of each individual lamp such that its condition can be known. One property that may be exploited with this goal in mind is the build-up of evaporated materials on the inner envelope of the lamp bulb (i.e. blackening).

U.S. Pat. No. 6,365,899 discloses a process for determination of lamp blackening based on the difference between the spectral radiant energy emitted by the lamp bulb when blackening occurs as compared to when blackening does not occur. Specifically, the amount of increase in radiant energy emitted by the bulb is detected in use relative to when the lamp was first turned on. Thus the method according to U.S. Pat. No. 6,365,899 relies on the change in radiated energy from the lamp itself to determine the degree of bulb blackening. This requires careful selection of the bandpass filters that are tailored for certain lamp types (Xenon, metal halide, high pressure mercury, UHP and others), which can cause interference with the lamp's strong emission lines resulting in system unreliability.

SUMMARY OF THE INVENTION

According one aspect of the present invention, a method and apparatus are set forth for measuring bulb blackening on the basis of bulb transmission, rather than change in radiated energy as in U.S. Pat. No. 6,365,899. Accordingly, there is no requirement for any spectral (or wavelength specific) measurements to be made and therefore no requirement for optical bandpass filters and the attendant difficulties discussed above. Moreover, unlike the methodology set forth in U.S. Pat. No. 6,365,899, the present invention does not require the lamp to be on in order to monitor the lamp condition, since the light source, is self contained. This is particularly useful for lamp modules that are not installed in a projector since a user can better select a lamp module for use in the projector based on the condition of the lamp as ascertained on the basis of measured bulb blackening.

In one embodiment, an inexpensive light source may be used to illuminate the lamp bulb and a sensor is used to measure light transmitted through the bulb. The light source may be powered by an internal battery within the module. By using the bulb transmission measurement in this manner, a 'real time' indication of lamp condition (age) is available to the projector user.

This together with other aspects and advantages which will be subsequently apparent, reside in the details of construction and operation as more fully hereinafter described and claimed, reference being had to the accompanying drawings forming a part hereof.

DETAILED DESCRIPTION OF THE PREFERRED EMBODIMENTS

Figure 1:
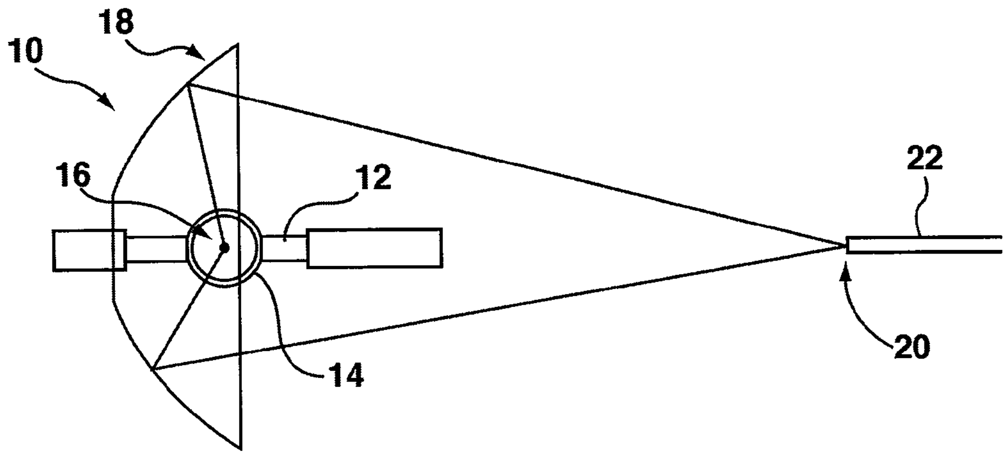
FIG. 1 (Prior Art)
FIG. 1 is a schematic representation of an ellipsoid reflector and lamp for a projector according to the prior art.

FIG. 1 shows the general operating principle of a typical lamp projector 10. As shown, light is first generated by the lamp 12 having a bulb 14 located at a first focal point 16 of ellipsoid reflector 18. Light is then re-imaged at a second focal point 20 that is co-incident with a further optics component 22, such as a projector lens or integrator rod.

Figure 2:
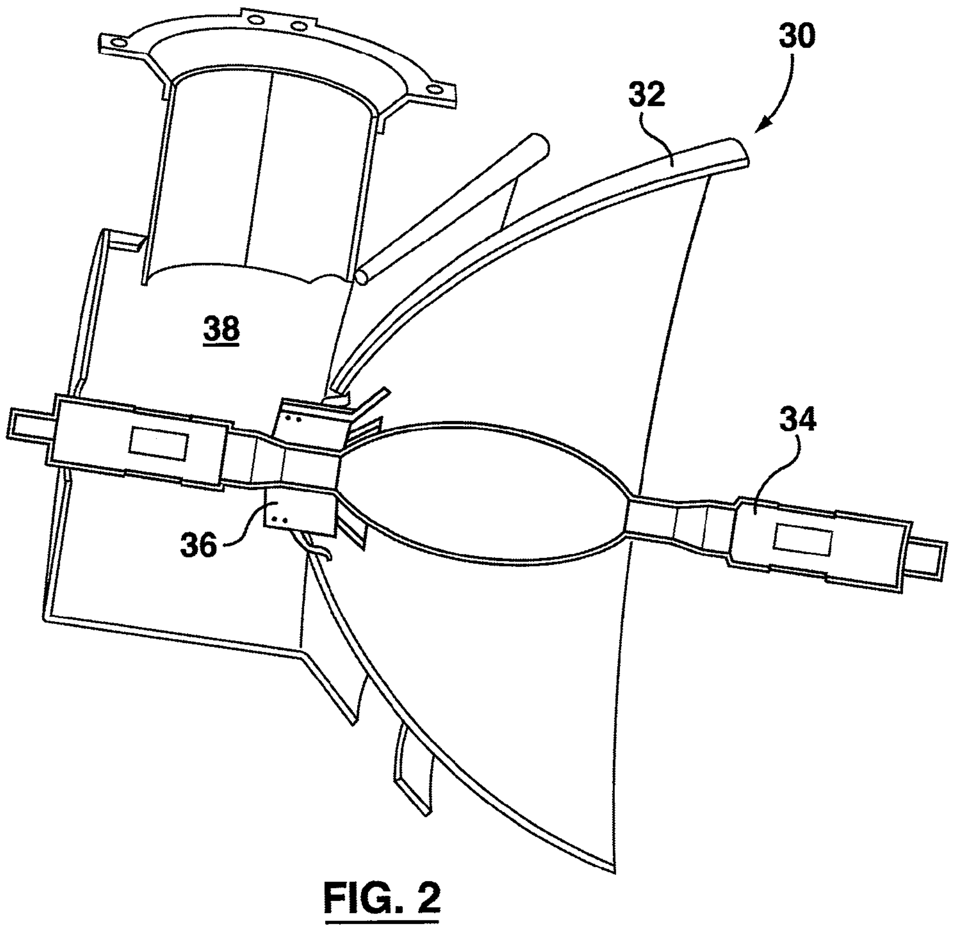
FIG. 2 is a partial sectional perspective view of projector assembly having an ellipsoid reflector and lamp according to FIG. 1.

Referring now to FIG. 2, a projector assembly is indicated generally by the numeral 30. The projector assembly 30 includes an ellipsoid reflector 32, and a typical 2.0-3.0 kW Xenon (Xe) lamp 34, as well as a cooperating cooling assembly comprising an air deflector 36, and a main blower duct 38. The assembly is usually contained within a protective lamphouse (FIG. 3) as part of a field replaceable lamp assembly, or the assembly is contained within the projector surrounded by light shielding to block stray light.

Figure 3:
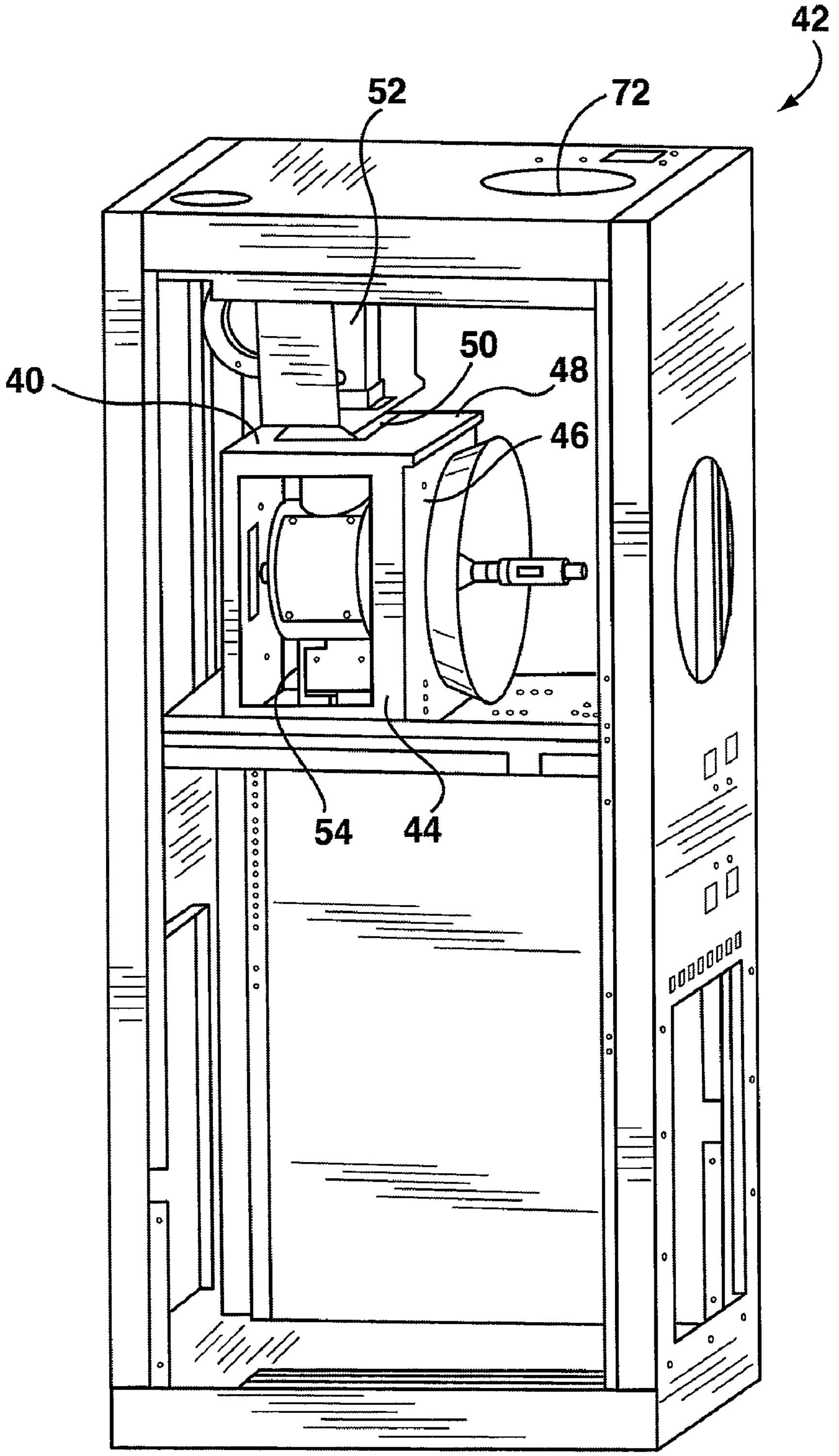
FIG. 3 (Prior Art)
FIG. 3 is a perspective view of a cinema console containing the projector assembly shown in FIG. 2.

More particularly, with reference to FIG. 3, the projector assembly 30 is mounted in a housing 40 (i.e. lamphouse) that facilitates placement of the projector assembly into a projector console cabinet 42. The housing 40 includes a support frame 44, a reflector mounting plate 46 and a housing cover 48. The housing cover 48 is provided with an opening 50 to permit the entry of cooling air from a top-mounted blower 52. The top-mounted blower is preferably mounted onto the console cabinet 42. The output port of the blower 52 is placed in close proximity to the opening 50 of the housing cover 48.

Mounting brackets 54 are used to retain the main blower duct and associated projector assembly 30 in position relative to the housing 40. The projector cabinet 42 is provided with an exhaust port 72 that connects with a suitable blower for removing hot air from the projector cabinet 42.

Figure 4:
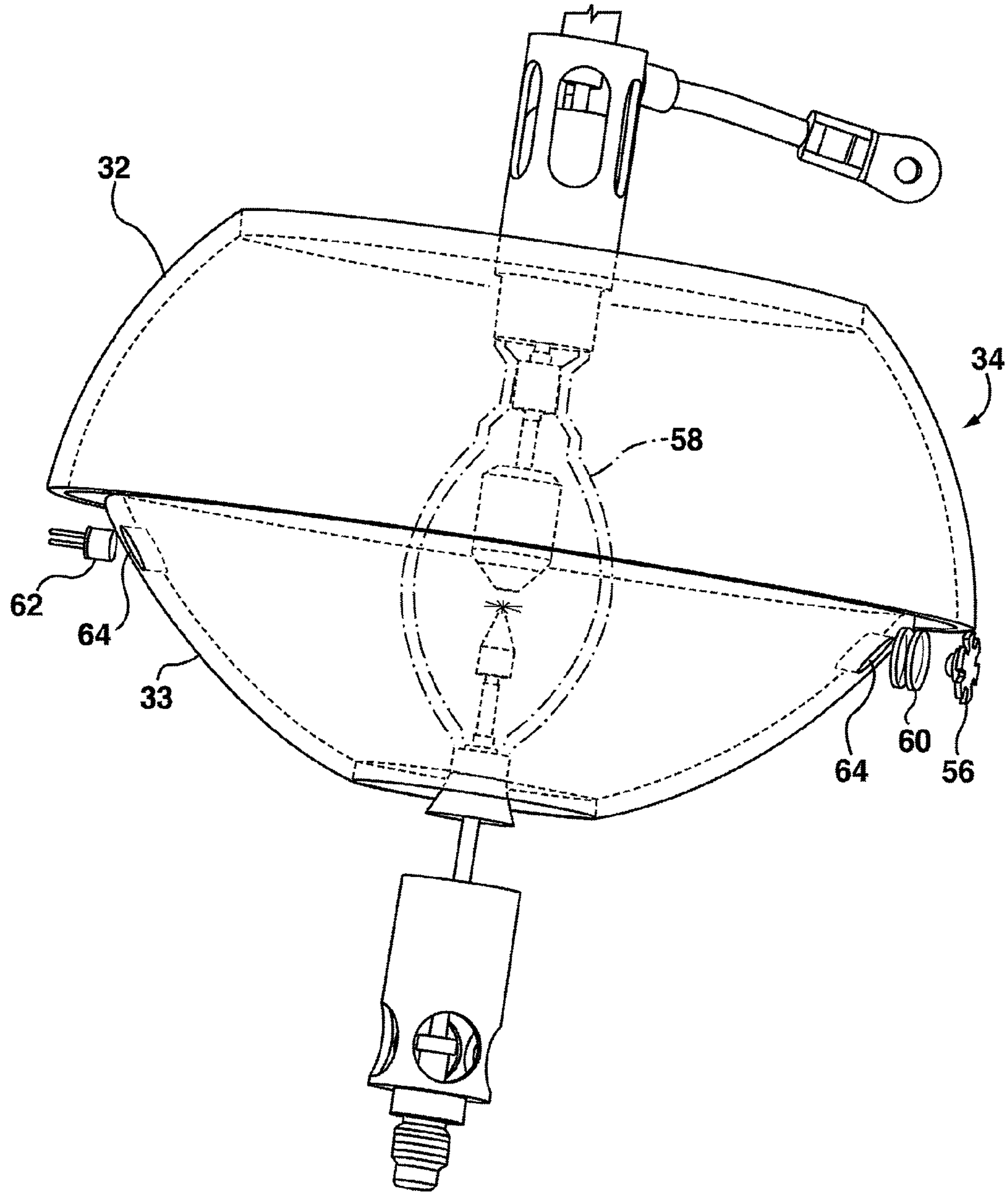
FIG. 4 is a schematic representation of an apparatus for measuring bulb blackening of the lamp in FIGS. 1-5 on the basis of bulb transmission, according to an aspect of the invention.

According to the exemplary embodiment of FIG. 4, a Xenon arc lamp 34 is provided with spherical and elliptical reflectors 32 and 33, respectively. An LED or laser light source 56 is used to illuminate the bulb 58 of lamp 34 via a collimating lens 60. The light transmitted through the bulb 58 is sensed by a sensor 62, such as a silicon photodiode sensor positioned on the opposite side of the reflector. Holes 64 are cut through the elliptical reflector 33 to facilitate transmission of the light beam.

According to one embodiment, apertures or optical filters may be included (not shown) to shield the LED 56 and photodiode 62 from the radiated output of lamp 34 while it is in operation. Bulb transmission measurement is recorded prior to each ignition of the lamp. After the lamp transmission measurement has been made, the apertures or optical filters may be automatically moved into position to close the holes 64 and thereby shield the photodiode sensor 62 when the lamp 34 is ignited and in operation.

Testing of the apparatus of FIG. 4 for monitoring the condition of projector lamp 34 was undertaken using an Ushio SGE03 lamp house with an Ushio CDXL-20SD lamp in a CP2000-M projector at 2100 Watts lamp power. A single white LED 56 was used to illuminate the bulb 58. In order to obtain a stable light output, a current limiting resistor (not shown) was connected in series with four 1.5V ‘C Type’ batteries for powering the LED 56. In the test configuration, sensor 62 was a UDT Type ‘211’ broadband silicon sensor.

At varying intervals of operating time, the ANSI brightness of the projector was measured. Immediately following brightness measurement, the bulb 34 was removed from the projector for bulb light transmission measurement using the configuration of FIG. 4. The results of projector brightness and bulb transmission are graphically represented in FIGS. 5A and 5B, respectively.

Figure 5A:
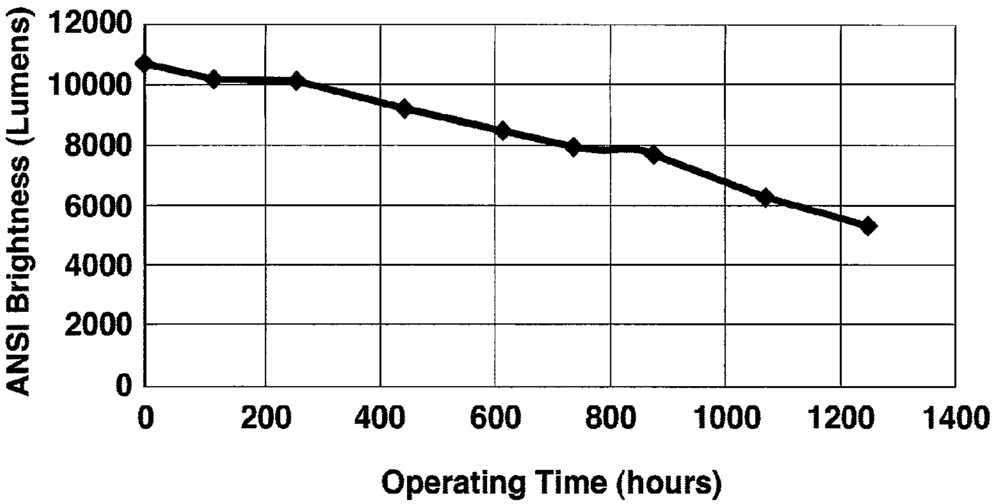
FIGS. 5A and 5B are graphs showing projector brightness and bulb transmission, respectively, over the operating life of the bulb whose transmission characteristics have been measured according to the apparatus of FIG. 4.
Figure 5B:
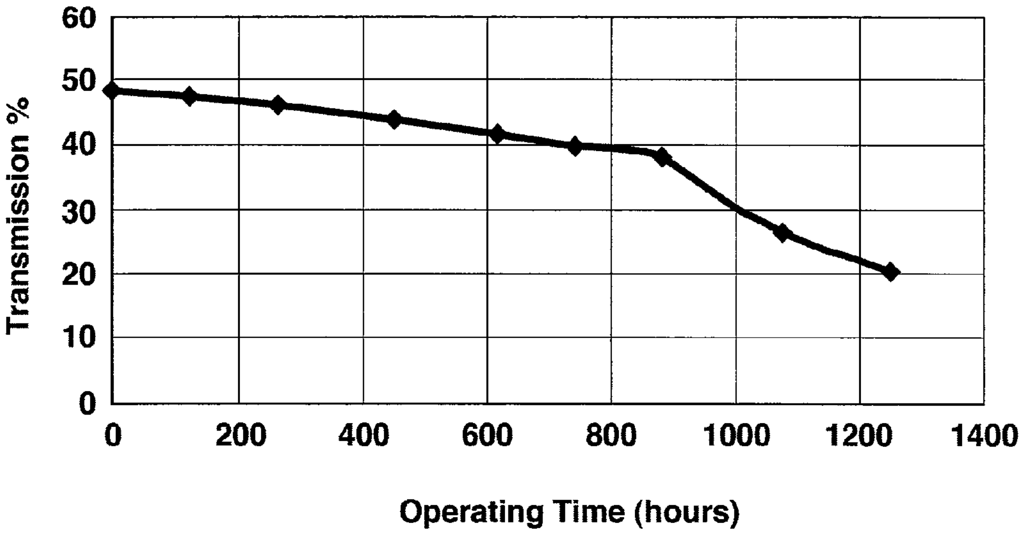

It will be noted from FIG. 5A that after 1250 hours of operating time, the projector brightness decreased by 50% of it’s initial value and from FIG. 5B it will be noted that the bulb transmission decreased by 57%.

The onset of lamp flicker was observed to occur at approximately 800 hours of use which coincides with an increased rate of bulb transmission loss, as shown in FIG. 5B.

From FIGS. 5A and 5B, a 97% correlation is evident between the bulb transmission measurement and projector brightness over a 1250 hour interval. The correlation figure improves to 99.4% over the shorter 800 hours of operating time.

Accordingly, by measuring light transmission through the bulb 58 of lamp 34 an accurate representation of lamp operating performance may be obtained.

As discussed above with reference to FIG. 5A and, for example, in U.S. Pat. No. 7,434,941, it is known in the art to calculate lamp luminous output over time. Indeed, it is common for lamp manufacturers to publish graphs of lamp luminous output over time with an indication of the number of lamp hours that represents the maximum allowable hours of use for the lamp, after which it should be replaced. Using the principles set forth herein, it is also possible to determine the remaining hours of use for a lamp based on bulb transmission as shown in FIG. 5B. In other words, by noting from a graph of lamp luminous output over time the lamp intensity at the maximum allowable hours of use and correlating that threshold lamp luminous output to bulb transmission the maximum allowable hours of use can be detected by measuring bulb transmission as set forth herein.

Determining the remaining hours of use of a lamp can be electronically computed by characterizing the bulb transmission curve into a polynomial expression or logarithmic expansion—a process known as curve fitting. Once this expression is known and loaded into the projector’s internal processor, the calculation of remaining hours of use can be automatically computed from the same equation.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of monitoring lamp condition, comprising:

i) directing a beam of light, from a source other than said lamp, at said lamp;

ii) detecting percent transmission of said beam through said lamp, said percent transmission being indicative of lamp blackening; and iii) repeating i) and ii) periodically to provide an indication of lamp blackening over time, said lamp blackening thereby providing an indication of lamp condition over time.

2. The method of claim 1, wherein i) and ii) are performed prior to ignition of said lamp.

3. The method of claim 1, further comprising providing an indication of remaining time of use of said lamp before a maximum allowable number of hours of use corresponding to a threshold percent transmission of said beam through said lamp.

4. Apparatus for monitoring lamp condition, comprising:

iv) a light source, other than said lamp, for directing a beam of light at said lamp; and v) a light sensor for detecting percent transmission of said beam through said lamp, said percent transmission being indicative of lamp blackening and said lamp blackening providing an indication of lamp condition.

5. The apparatus of claim 4, wherein said light source and said light sensor are disposed outside of a reflector that surrounds said lamp and wherein said beam of light passes through holes in said reflector adjacent said light source and said light sensor, respectively.

6. The apparatus of claim 4, wherein said light source is one of either an LED, laser or filament bulb.

7. The apparatus of claim 4, wherein said light sensor is one of either a photodiode or photometric sensor.

8. The apparatus of claim 4, further including a collimating lens for aligning said beam of light.

9. The apparatus of claim 5 further including at least one of either an apertures or optical filter for shielding said light source and said light sensor from the radiated output of said lamp when said lamp is in operation.

10. Use of the apparatus of claim 4 for providing an indication of remaining time of use of said lamp before a maximum allowable number of hours of use corresponding to a threshold percent transmission of said beam through said lamp.

* * * * *